(12) United States Patent
Ruijter

(10) Patent No.: US 9,680,608 B2
(45) Date of Patent: Jun. 13, 2017

(54) COMMUNICATION PROTOCOL WITH REDUCED OVERHEAD

(71) Applicant: Silicon Laboratories Inc., Austin, TX (US)

(72) Inventor: Hendricus de Ruijter, Sunnyvale, CA (US)

(73) Assignee: SILICON LABORATORIES INC., Austin, TX (US)

(*) Notice: Subject to any disclaimer, the term of this patent is extended or adjusted under 35 U.S.C. 154(b) by 277 days.

(21) Appl. No.: 14/317,902

(22) Filed: Jun. 27, 2014

(65) Prior Publication Data

US 2015/0381772 A1 Dec. 31, 2015

(51) Int. Cl.
*H04W 4/00* (2009.01)
*H04L 1/00* (2006.01)
*H04L 1/16* (2006.01)

(52) U.S. Cl.
CPC .......... *H04L 1/0083* (2013.01); *H04L 1/1607* (2013.01)

(58) Field of Classification Search
CPC ...................................................... H04L 69/22
See application file for complete search history.

(56) References Cited

U.S. PATENT DOCUMENTS

| | | | |
|---|---|---|---|
| 4,984,233 A | 1/1991 | Nakayashiki | |
| 5,410,664 A | 4/1995 | Brooks | |
| 6,757,806 B2 | 6/2004 | Shim | |
| 7,000,029 B2 | 2/2006 | Marian | |
| 7,257,096 B2 | 8/2007 | Kim | |
| 7,287,145 B1 | 10/2007 | Simeral | |
| 7,403,203 B2 | 7/2008 | Roach | |
| 7,822,070 B2 | 10/2010 | Van Vlimmeren | |
| 8,009,601 B2 | 8/2011 | Stephens | |
| 8,233,014 B2 | 7/2012 | Chiou | |
| 2007/0013705 A1 | 1/2007 | Roach | |
| 2007/0263631 A1 | 11/2007 | Mallory | |
| 2008/0130542 A1 | 6/2008 | Tang | |
| 2009/0175255 A1 | 7/2009 | Akiyama | |
| 2009/0265782 A1 | 10/2009 | Tang | |
| 2010/0017301 A1 | 1/2010 | Alva | |
| 2010/0039969 A1 | 2/2010 | Sukenari | |
| 2010/0073345 A1 | 3/2010 | Huang | |
| 2010/0128706 A1 | 5/2010 | Lee | |
| 2010/0289295 A1 | 11/2010 | Yoda | |
| 2011/0007678 A1 | 1/2011 | Kneckt | |
| 2011/0063333 A1 | 3/2011 | Chiou | |
| 2012/0056753 A1 | 3/2012 | Chen | |

(Continued)

OTHER PUBLICATIONS

High-Performance, Integrated ZigBee/802.15.4 System-on-Chip, Silicon Laboratories, Inc., Aug. 2013.

(Continued)

*Primary Examiner* — Gerald Smarth
(74) *Attorney, Agent, or Firm* — Cesari & Reed, LLP; R. Michael Reed

(57) ABSTRACT

An apparatus includes a transceiver having a MAC controller and a PHY controller. The MAC controller is configured to selectively omit at least a portion of a field of a media access control (MAC) frame. The PHY controller is configured to insert the MAC frame into a physical protocol data unit and to selectively configure a portion of the physical protocol data unit to indicate omission of at least the portion of the field from the MAC frame.

21 Claims, 7 Drawing Sheets

(56) References Cited

U.S. PATENT DOCUMENTS

| | | | |
|---|---|---|---|
| 2012/0155349 A1* | 6/2012 | Bajic | H04W 4/008 |
| | | | 370/311 |
| 2012/0163264 A1 | 6/2012 | Chu | |
| 2012/0320932 A1 | 12/2012 | Xu | |
| 2013/0155929 A1* | 6/2013 | Aboul-Magd | H04W 28/06 |
| | | | 370/311 |
| 2013/0155952 A1* | 6/2013 | Chu | H04L 45/74 |
| | | | 370/328 |
| 2014/0036775 A1* | 2/2014 | Asterjadhi | H04W 28/065 |
| | | | 370/328 |
| 2014/0071873 A1* | 3/2014 | Wang | H04W 74/08 |
| | | | 370/311 |
| 2014/0198780 A1* | 7/2014 | Qi | H04W 28/065 |
| | | | 370/338 |

OTHER PUBLICATIONS

Maximizing Range and Battery Life in Low-Cost Wireless Networks, Silicon Laboratories, Inc., Feb. 8, 2012.
IEEE802.15.4g MR-FSK Measurement Solution, IEEE Std 802.15.4gTM-2012, Anritsu Corporation, May 2013.
ISO 15765-2, Wikepedia http://en.wikepedia.org/wiki/ISO_15765-2, at least as early as May 2, 2014.

* cited by examiner

COMMUNICATION PROTOCOL WITH REDUCED OVERHEAD

FIELD

The present disclosure is generally related to communication protocols.

BACKGROUND

Portable communication devices, such as smart phones and radios, may utilize one or more communication protocols for receiving and/or sending data through a communication channel. In some instances, such communication protocols may define particular data structures, including formatting and position of particular datum within portions of the data structures.

SUMMARY

In some embodiments, an apparatus includes a transceiver having a MAC controller and a PHY controller. The MAC controller is configured to selectively omit at least a portion of a field of a media access control (MAC) frame. The PHY controller is configured to insert the MAC frame into a physical protocol data unit and to selectively configure a portion of the physical protocol data unit to indicate omission of at least the portion of the field from the MAC frame.

In other embodiments, a method includes selectively omitting or including at least a portion of a media access control (MAC) frame. The method further includes selectively configuring a physical protocol data unit to include the MAC frame and to include an indication of the omission or inclusion of the portion of the field.

In still other embodiments, an apparatus includes a transceiver having a media access control (MAC) controller and a physical layer (PHY) controller. The MAC controller selectively omits at least a portion of a media access control (MAC) frame. The PHY controller inserts the MAC frame into a physical protocol data unit and selectively configures a portion of the physical protocol data unit to indicate omission of the portion of the MAC frame.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
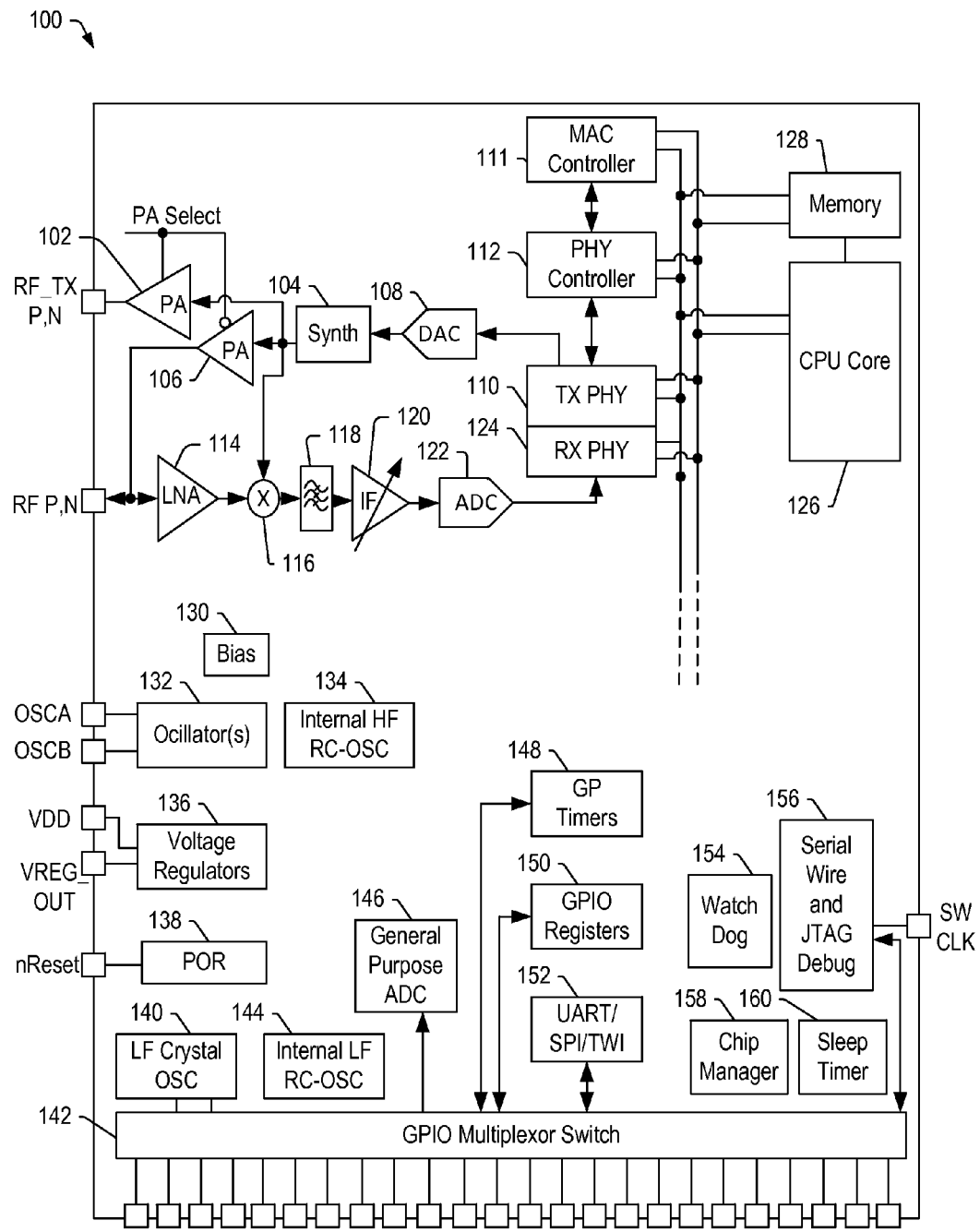
FIG. 1 is a block diagram of a circuit configured to provide a communication protocol with reduced overhead according to certain embodiments.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented in hardware, firmware, or any combination thereof. Dedicated hardware implementations including, but not limited to, application specific integrated circuits, programmable logic arrays, and other hardware devices can likewise be constructed to implement the methods and functions described herein. Further, in accordance with other embodiments, the methods and functions described herein as instructions executable by a processor or controller.

Embodiments of apparatuses and methods are described below that provide a communication protocol with reduced overhead. In certain embodiments, a transceiver may be configured to selectively alter selected fields of a media access control (MAC) frame and to configure one or more fields of a physical protocol data unit (PPDU) to indicate such alterations. In certain embodiments, a MAC controller may selectively alter portions of a MAC frame of a sequence of MAC frames to omit fields or to otherwise reduce a number of transmitted bits in MAC frames within a frame sequence.

In multi-frame data transfers, embodiments of apparatuses and methods are described below that can transfer such frame parameters in the initial frame and, once receipt of the initial frame is acknowledged, the embodiments may reduce, alter, or omit such frame parameters to reduce power consumption. Such frame parameters may include, but are not limited to, a destination address and personal area network (PAN) identifier (ID) parameter, a source address and PAN ID parameter, a frame type parameter, an acknowledge request parameter, a frame pending parameter, and a security enabled parameter. In certain embodiments, frame parameter repetition may be signaled in the PHY header or in the start-of-frame delimiter of the synchronization header, for example, making it possible to omit or otherwise alter portions of the MAC frame to provide reduced overhead. In certain examples, when more than one MAC frame is transmitted, the frame control field and the address field may be omitted after the first frame, saving several bytes per MAC data frame and thus reducing overall power consumption. Further, both ends of the communication link may benefit in terms of power consumption due to the reduced number of bytes, thus prolonging battery life in both the transmitting and receiving devices.

FIG. 1 is a block diagram of a circuit or apparatus 100 configured to provide a communication protocol with reduced overhead according to certain embodiments. The circuit 100 includes a plurality of input/outputs (I/Os) including a radio frequency (RF) transmit (TX) positive (P) and negative (n) I/O, an RF P-N I/O, a first oscillator I/O (OSCA), a second oscillator I/O (OSCB), a regulator voltage input (VDD), and a regulator voltage output (VREG_OUT). The circuit 100 further includes a reset I/O (nReset), a software clock I/O (SW CLK), and a plurality of general purpose I/Os coupled to a general purpose I/O multiplexer switch 142.

The circuit 100 may include a power amplifier 102 having an output coupled to the RF_TX P-N I/O, a control input coupled to a power amplifier (PA) select input, and an input coupled to an output of a synthesizer 104. The output of the synthesizer 104 also may be coupled to an input of a power amplifier 106, which may have a control input coupled to the PA select input, and an output coupled to the RF P-N I/O. The synthesizer 104 may include an input coupled to an output of a digital-to-analog converter (DAC) 108, which may have an input coupled to an output of a transmit physical layer component (TX PHY) 110. The TX PHY 110 may be coupled to a PHY controller 112, which may be coupled to a MAC controller 111.

The circuit 100 may include a low-noise amplifier (LNA) 114 having an input coupled to the RF P-N I/O and an output coupled to a node 116, which may be coupled to the output of synthesizer 104. The node 116 may include an output coupled to an input of a saw filter 118, which has an output coupled to an adjustable, intermediate frequency amplifier 120. The amplifier 120 includes an output coupled to an input of an analog-to-digital converter (ADC) 122, which has an output coupled to a receive PHY component (RX PHY) 124. In certain embodiments, the MAC controller 111 and the PHY controller 112 may be shared by TX PHY 110 and the RX PHY 124 and across transmit and receive functions.

In certain embodiments, the circuit 100 may include bias circuit 130, which may be coupled to any of the circuitry within circuit 100. The circuit 100 may also include one or more oscillators 132 coupled to the first and second oscillator I/Os, Additionally, the circuit 100 may include an internal, high frequency resistor-capacitor (RC) oscillator (resonant tank) 134. Additionally, the circuit 100 may include a voltage regulator 136 coupled to the regulator voltage input (VDD) and the regulator voltage output (VREG_OUT). The circuit 100 may further include a power-on-reset (POR) circuit 138 coupled to the reset I/O (nReset).

In certain embodiments, the circuit 100 may also include a low-frequency crystal oscillator 140 coupled to the GPIO multiplexor switch 142 and may include an internal low-frequency RC-oscillator 144. The circuit 100 may further include a general purpose ADC 146, general purpose (GP) timers 148, GPIO registers 150, and a universal asynchronous receiver/transmitter (UART)/serial peripheral interface (SPI)/two-wire serial interface (TWI) 152 coupled to the GPIO multiplexor switch 142.

In certain embodiments, the circuit 100 may further include a central processing unit (CPU) 126 coupled to a memory device 128, which may include a random access memory, a flash memory, other non-volatile memory, or any combination thereof. The CPU 126 may be communicatively coupled to the TX PHY 110, the RX PHY 124, the MAC controller 111, and the PHY controller 112.

In certain embodiments, the circuit 100 may also include a watch dog circuit 154, a chip manager 158, and a sleep timer 160. The circuit 100 may further include a serial wire and joint test action group (JTAG) debug circuit 156, which may be coupled to the software clock I/O and to the GPIO multiplexor switch 142.

In certain embodiments, the circuit 100 may be configured to exceed the dynamic range requirements imposed by the Institute of Electrical and Electronics Engineers (IEEE) Standard 802.15.4-2003 by over 15 dB, which standard specifies the physical layer and media access control for low-rate wireless personal area networks standard. The integrated receive channel filtering provided by LNA 114, saw filter 118, and amplifier 120 allow for robust co-existence with other communication standards in the 2.4 GHz spectrum, such as IEEE 802.11-2007 (short-range wireless) standard and the Bluetooth® communications standards. The integrated regulator 136, VCO (oscillators 132), loop filter, and power amplifiers 102 and 106 maintain a low external component count.

In certain embodiments, the CPU 126 may be an integrated 32-bit or 64-bit processor configured for high performance, low power consumption, and efficient memory utilization. In certain embodiments, the CPU 126 may include an integrated microprocessor unit (MPU). Further, in certain embodiments, the memory 128 may include 128 kB or more of flash memory, 12 kB or more of RAM memory for data and program storage, and other memory.

In certain embodiments, the circuit 100 integrates multiple MAC functions, an encryption accelerator (not shown), and automatic CRC handling into the hardware. The MAC hardware (MAC controller 111) may be configured to handle automatic acknowledgment (ACK) transmission and reception, automatic backoff delays, and clear channel assessment for transmission, as well as automatic filtering of received packets.

In certain embodiments, the TX PHY 110 may utilize the MAC controller 111 to selectively alter portions of a MAC frame within a sequence of MAC frames to reduce the number of bytes within the MAC frame. The TX PHY 110 may further utilize the PHY controller 112 to selectively omit (or alter) a portion of a physical protocol data unit (PPDU) to indicate the omission (or alteration) of the MAC frame. In certain embodiments, the RX PHY 124 may receive a PPDU having a portion indicating an altered or omitted portion of a MAC frame, and may provide a signal to the MAC controller 111 to indicate the alteration or omission. Further, the MAC controller 111 may decode the MAC frame from a payload of the PPDU based on the indicated alteration or omission.

In a particular, non-limiting example, when more than one frame is transmitted, the MAC controller 111 may determine that the MAC frame is not a first frame or a last frame of a frame sequence. The MAC controller 111 may selectively omit at least a portion of one of a control field and an address field of the MAC frame. In an example, the MAC controller 111 may omit the control field, the address field, another field, or any combination thereof from the MAC frame. In another example, the MAC controller 111 may selectively alter at least a portion of a field of the MAC frame, reducing the overall byte count of the frame and thus reducing power consumption. When a last frame is transmitted, the MAC controller 111 may include the frame control field in the MAC frame with the frame pending bit of the frame control field set to zero. In addition, the PHY controller 112 may include a signal, such as a bit setting within a start-of-frame delimiter (SFD) of a synchronization portion of the PPDU, a bit setting within a PHY header, a bit value in another portion, or any combination thereof, to indicate the omission or alteration of the MAC frame.

Figure 2:
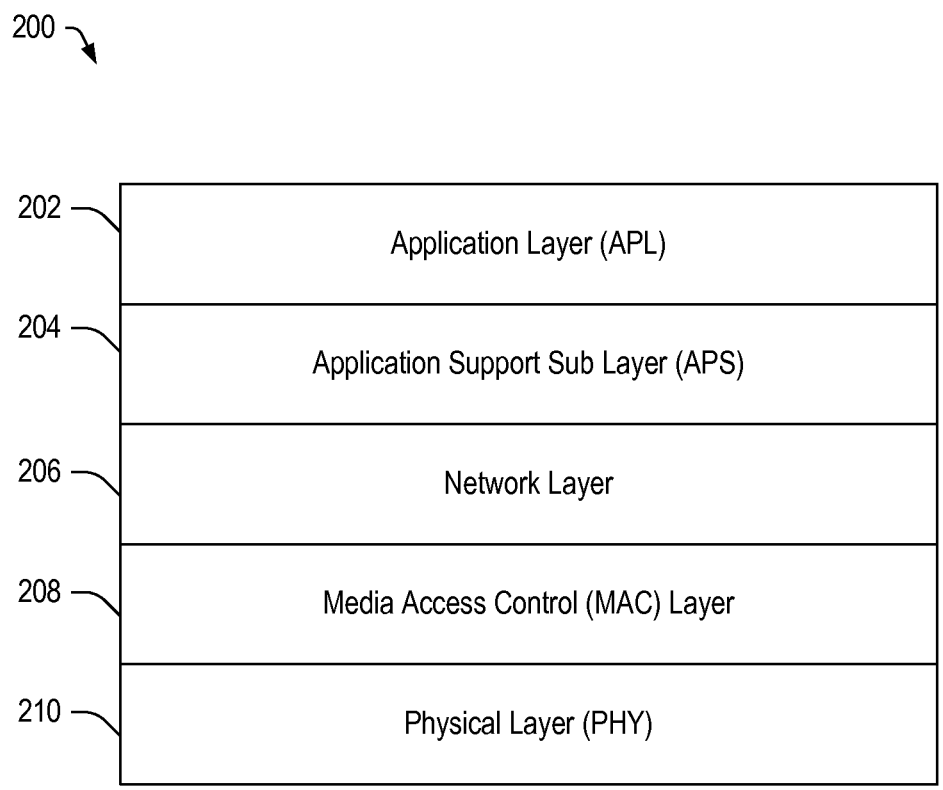
FIG. 2 is a block diagram of an Open Systems Interconnection (OSI) model configured to provide a communication protocol with reduced overhead according to certain embodiments.

FIG. 2 is a block diagram of an Open Systems Interconnection (OSI) model 200 configured to provide a communication protocol with reduced overhead according to certain embodiments. In certain embodiments, the OSI model 200 may represent hardware, software, or any combination thereof within circuit 100 and may be configured to provide the communication protocol having reduced overhead. The OSI model 200 includes an application layer (APL) 202, application support sub layers (APS) 204, a network layer 206, a MAC layer 208, and a physical layer (PHY) 210.

In some embodiments, the APL 202 may represent user programs. The APS 204 may represent services and instruction sets to interface the APL 202 to lower layers of the OSI model. The network layer 206 may represent network communications and network interfaces. The MAC layer 208 communicates with the PHY layer 210 via primitives (a set of commands or fundamental instructions) through a service access point. When the MAC layer 208 instructs the PHY layer 210 to transmit data, the PHY prepares physical protocol data units (PPDUs) for transmission. The MAC layer 208 maps the data into a suitable MAC frame format, and the PHY layer 210 maps the MAC frames into the payload of the PPDUs. During the formation of the PPDU, the PHY layer 210 may append a PHY-specific preamble, SFD, header field, or any combination thereof to the packet to produce a data unit that includes the MAC frame. In some embodiments, packets may be received by the PHY layer 210. The PHY layer 210 may extract frames from the packet and deliver the extracted frames to the MAC layer.

In certain embodiments, the PHY layer 210 may be configured to provide carrier sense/clear channel assessment (CS/CCA) functions, transmit functions, and receive functions. The CS/CCA function may be used to determine the state of the transmission medium. The CS/CCA operation may be executed while the receiver is turned on and the circuit 100 is not currently receiving or transmitting a data unit (such as a PPDU). The CS/CCA procedure may be used to detect the start of a network signal that can be received (CS) and to determine whether the channel is clear prior to transmitting a data unit (CCA).

The PHY layer 210 may also be configured to transmit individual octets of a data frame (or data unit). The transmit procedure may be invoked by the CS/CCA procedure immediately upon receiving a transmit instruction from the MAC layer 208. The CSMA/CA protocol may be performed by the MAC layer 208.

The PHY layer 210 may also be used to receive individual octets of the data frame. The receive procedure may be invoked by the CS/CCA procedure upon detecting a portion of a preamble sync pattern followed by a valid start-of-frame delimiter (SFD) and a PPDU header.

In certain embodiments, when more than one MAC frame is being transmitted, after transmission and acknowledgment of the first MAC frame, the MAC layer 208 may alter, omit, or otherwise reduce at least a portion of the MAC frame, such as by altering a frame control field and an address field of the MAC frame. When the last frame of the sequence is produced, the MAC layer 208 may include a frame control field within the MAC frame that has a frame pending bit set to zero. Thus, repetitive frame parameters may be transferred in the initial frame and then may be omitted, altered or reduced in subsequent frames. The frame parameter repetition (and/or the absence or alteration of the MAC frame) may be signaled in the PHY header or in the SFD.

In certain embodiments, the PHY layer 210 may insert the MAC frame into a payload of a PPDU and may utilize a portion of the PPDU to signal the omission/alteration/reduction within the MAC frame. In certain embodiments, the PHY layer 210 may signal the frame repetition (i.e., the omitted, altered, or reduced portion of the MAC frame) using the PHY header, the preamble, the SFD, another portion, or any combination thereof.

The above-discussion has focused on the structure and OSI model elements that may be configured to provide a communication protocol having reduced overhead. In certain examples, by reducing, altering, or omitting portions of the MAC frame to reduce the repetition of frame parameters that don't change from frame-to-frame within a sequence of frames, the on-time of the transceiver may be reduced because the overall size of each frame is made shorter than the initial frame. Since the on-time is reduced, the overall power consumption is also reduced. Thus, in a multi-frame data transfer, overhead may be reduced. One possible example of a MAC frame, portions of which may be altered or omitted to provide reduced overhead, is described below with respect to FIG. 3.

Figure 3:
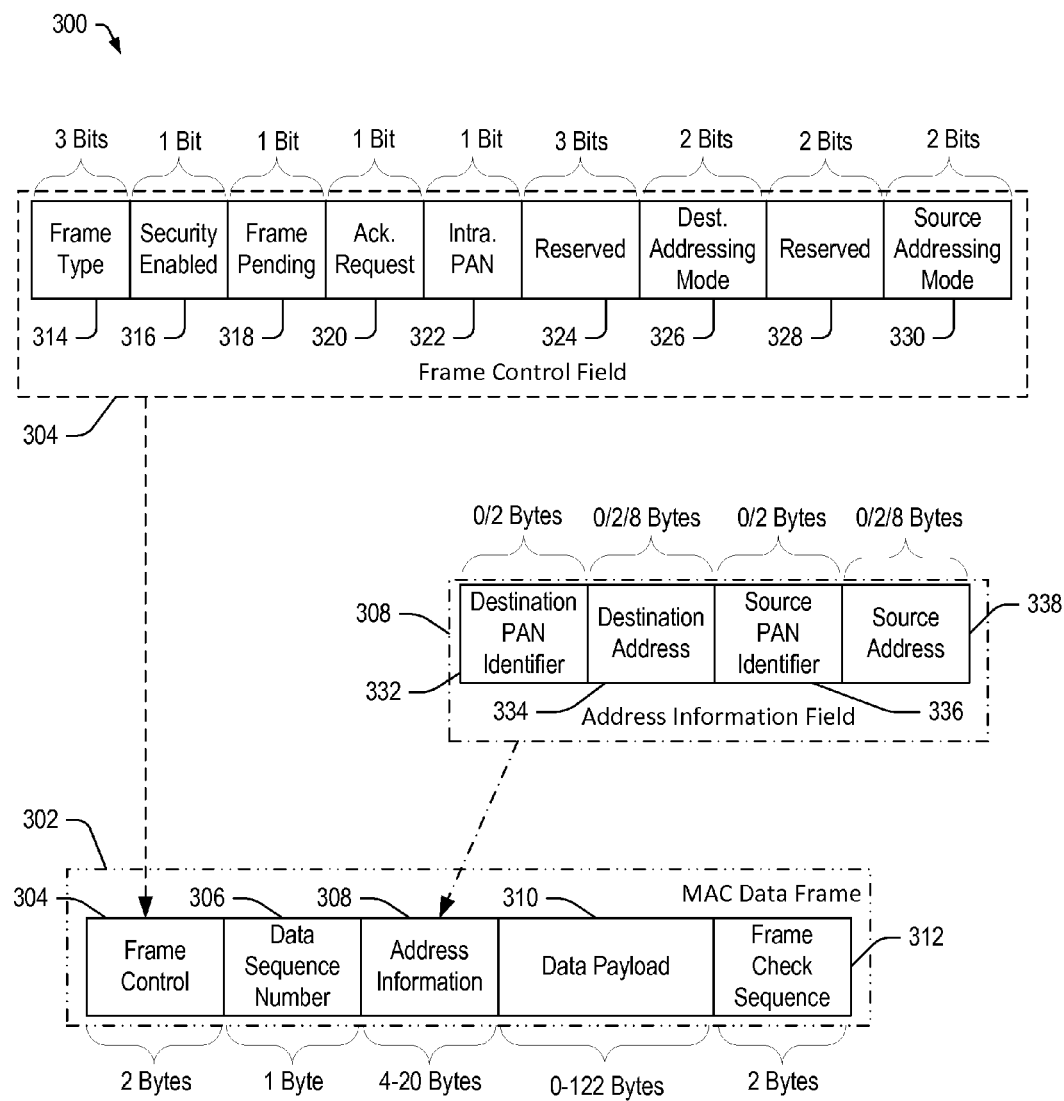
FIG. 3 is block diagram of a media access control (MAC) frame including multiple fields, some of which may be selectively omitted to provide a communication protocol with reduced overhead according to certain embodiments.

FIG. 3 is block diagram 300 of a media access control (MAC) frame 302 including multiple fields, some of which may be selectively omitted to provide a communication protocol with reduced overhead according to certain embodiments. The MAC frame 302 includes a frame control field 304 carrying two bytes of data, a data sequence number field 306 carrying one byte of data, an address information field 308 carrying four to twenty bytes of data, a data payload field 310 carrying zero to one hundred twenty-two bytes of data, and a frame check sequence field 312 carrying two bytes of data.

The frame control field 304 includes a frame type field 314 carrying three bits of data, a security enabled field 316 carrying one bit of data, a frame pending field 318 carrying one bit of data, an acknowledgment request field 320 carrying one bit of data, an intra—Personal Area Network (PAN) 322 carrying one bit, a reserved field 324 having three bits, a destination addressing mode field 326 having two bits, a reserved field 328 having two bits, and a source addressing mode field 330 having two bits. The frame control field 304 totals 16 bits or two bytes of data.

The address information field 308 includes a destination PAN identifier 332 having zero to two bytes of data, a destination address field 334 having zero, two, or eight bytes of data, a source PAN identifier 336 having zero to two bytes of data, and a source address field 338 having zero, two or eight bytes of data. The address information field can have between four and twenty bytes of data.

In certain embodiments, after transmission of a first MAC frame of a sequence of frames and after acknowledgment of the first MAC frame, subsequent MAC frames may omit, reduce, or alter at least a portion of the frame control field 304 and the address field 308, which contain repeated frame parameters. In certain embodiments, the MAC layer 208 may omit the frame control field 304 and the address information field 308, reducing the MAC frame by twenty-two bytes of data and thus reducing overhead.

In certain embodiments, when more than one frame is transmitted, the frame control field 304 and the address field 308 may be omitted after the first frame, reducing overhead. When the last frame is transmitted, the frame control field 304 may be transmitted with the frame pending bit 318 set to zero. When the frame pending bit 318 is set to zero and the frame type field 314 does not specify that this frame is an acknowledgment frame or a beacon frame, the source addressing mode field 330 shall be non-zero, implying that the frame is directed to a personal area network (PAN) coordinator with the PAN identifier as specified in the Destination PAN identifier field.

Figure 4:
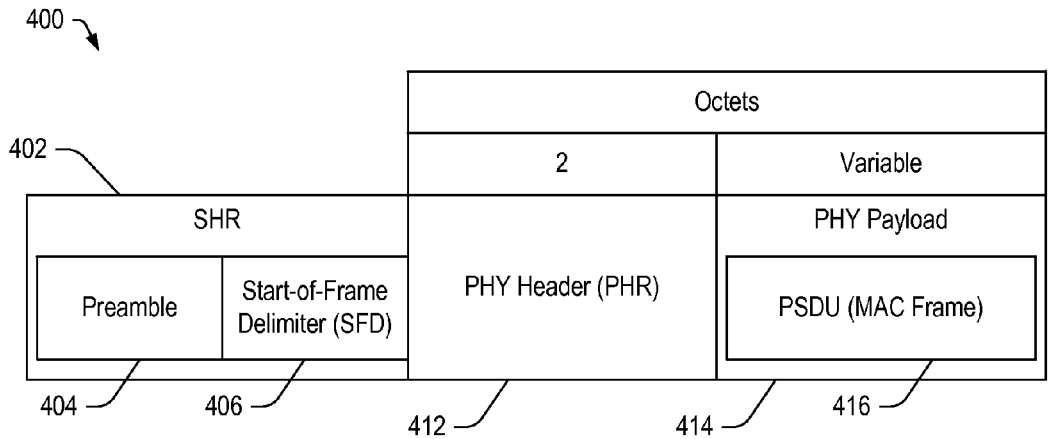
FIG. 4 is a block diagram of a physical protocol data unit including a MAC frame configured to provide reduced overhead according to certain embodiments.
Figure 5:
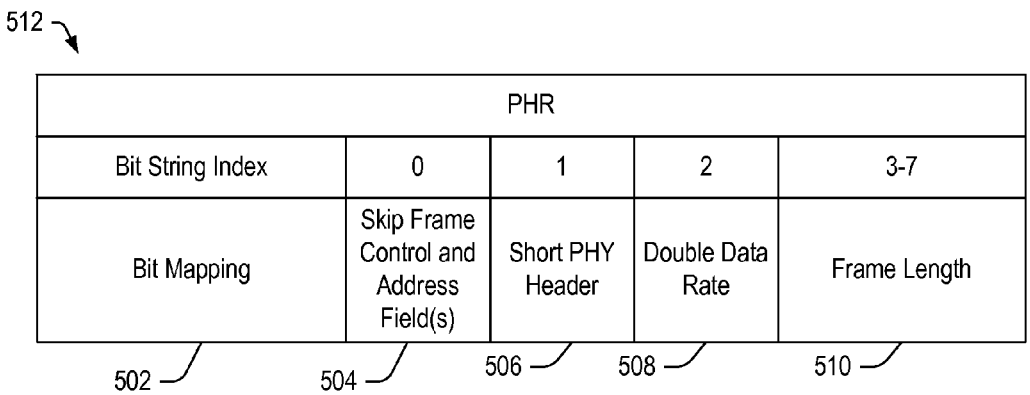
FIG. 5 is a block diagram of a physical protocol header of the physical protocol data unit including a field configured to indicate an alteration or omission of at least a portion of the MAC frame according to certain embodiments.
Figure 6:
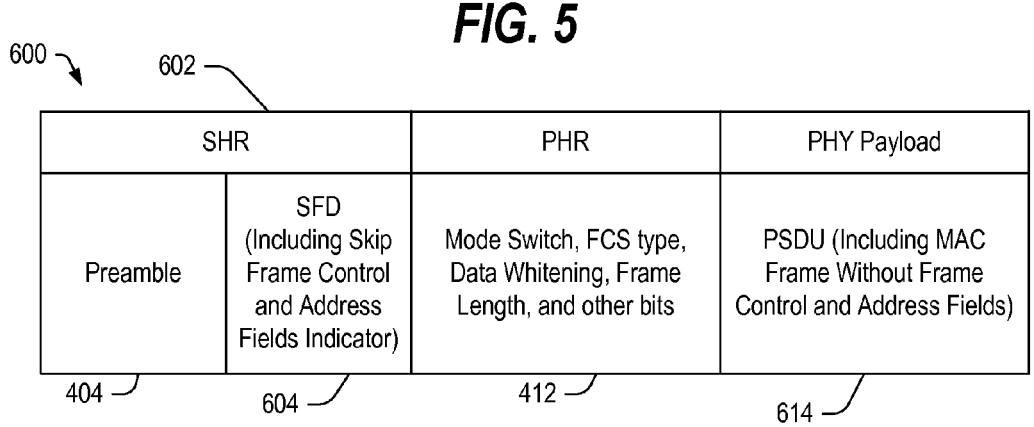
FIG. 6 is a block diagram of a physical protocol data unit including a synchronization header having a start-of-frame delimiter configured to indicate an alteration or omission of at least a portion of the MAC frame according to certain embodiments.

The following discussion of FIGS. 4-6 describes a PPDU having as its payload a MAC frame and including a signal within the PHY header, the SFD, or another portion of the PPDU that signals a change or omission corresponding to at least a portion of the MAC frame. A representative example of a PPDU is described below with respect to FIG. 4.

FIG. 4 is a block diagram of a physical protocol data unit (PPDU) 400 including a PHY payload 414 having MAC frame 416 configured to provide reduced overhead according to certain embodiments. The PPDU 400 may include a synchronization header 402 that may include a preamble 404 and an SFD 406. The PPDU 400 may further include a PHY header 412 and the PHY payload 414. The PHY payload 414 may carry the MAC frame 416.

In the illustrated example, the PHY header 412 may include two octets (or bytes) of data, and the PHY payload 414 may include a variable number of octets (or bytes) of data. In certain embodiments, the PHY header 412, the preamble, the SFD 406, or any combination thereof may be modified to signal an alteration or omission of at least a portion of the MAC frame 416 within the PHY payload 414. An example of a PHY header that has been modified to signal the alteration or omission within the MAC frame 416 is described below with respect to FIG. 5.

FIG. 5 is a block diagram of a physical layer header 512 of the PPDU 400 of FIG. 4 including a field 504 configured to indicate an alteration or omission of at least a portion of the MAC frame according to certain embodiments. The PHY header 512 includes a bit string index or bit mapping 502 that has a skip frame control and address field(s) bit (bit 0) 504, a short PHY header bit (bit 1) 506, a double data rate bit (bit 2) 508, and frame length bits (bits 3-7) 510 indicating the overall length of the PPDU 400. In certain embodiments, the skip frame control and address field(s) may utilize two bits to indicate four possible levels of alteration/omission. For example, a first combination of bits may represent no omission of the frame control field and the address field. A second combination of bits may represent omission of the frame control field. A third combination of bits may represent omission of the address field. A fourth combination of bits may represent omission of both the frame control field and the address field. In certain embodiments, the short PHY header bit 506 may be used to provide the second bit for the skip frame control and address field.

In certain embodiments, the skip frame control and address field(s) bit 504 may be set to indicate an omission or alteration within the MAC frame 416. In certain embodiments, the skip frame control and address field(s) bit 504 may indicate that the frame control field 304 and the address information field 308 may be omitted, reducing the overall size of the PPDU by up to twenty-two bytes of data. Within a sequence of PPDUs, the PPDUs between the first PPDU and the last PPDU may include an altered MAC frame 416 and may include a bit setting within the skip frame control and address field(s) bit 504 that indicates such an alteration.

In certain embodiments, the altered MAC frames 416 may omit transmission of repetitive frame parameters, thereby reducing overhead relative to a conventional packet that may include the frame parameters with each PPDU.

As mentioned above, the PPDU 400 may include a SFD that provides a signal of the alteration or omission within the MAC frame 416. One possible example of such a configuration is described below with respect to FIG. 6.

FIG. 6 is a block diagram of a PPDU 600 including a synchronization header 602 having a start-of-frame delimiter (SFD) 604 configured to indicate alteration or omission of at least a portion of the MAC frame according to certain embodiments. The synchronization header 602 may include a preamble 404 and the SFD 604. The PPDU 600 may further include the PHY header 412, which may include mode switch bits, frame type bits, data whitening bits, frame length bits, and other bits. The PPDU may also include the PHY payload including a MAC frame 614 having at least an altered portion. The altered portion may include omitted or altered control field data, address field data, other data, or any combination thereof.

In certain embodiments, the SFD 604 provides word synchronization for the start of frame. The SFD 604 further provides a signal to indicate the alteration or omission of at least a portion of the MAC frame. In some examples, additional hardware may be included to detect multiple SFDs in parallel and/or to reduce the probability of false SFD detection.

In certain embodiments, a sequence of PPDUs may be sent from a transceiver to a receiving device. The first PPDU may include a complete MAC frame in its payload field. Subsequent PPDUs of the sequence may include shortened MAC frames that omit repetitive data from the already transmitted MAC frame and may include a signal indicating the omission or alteration of the MAC frame. The last PPDU may include a MAC frame that includes at least a frame pending bit that indicates the last MAC frame of the sequence. One possible example of this sequence is described below with respect to FIG. 7.

Figure 7:
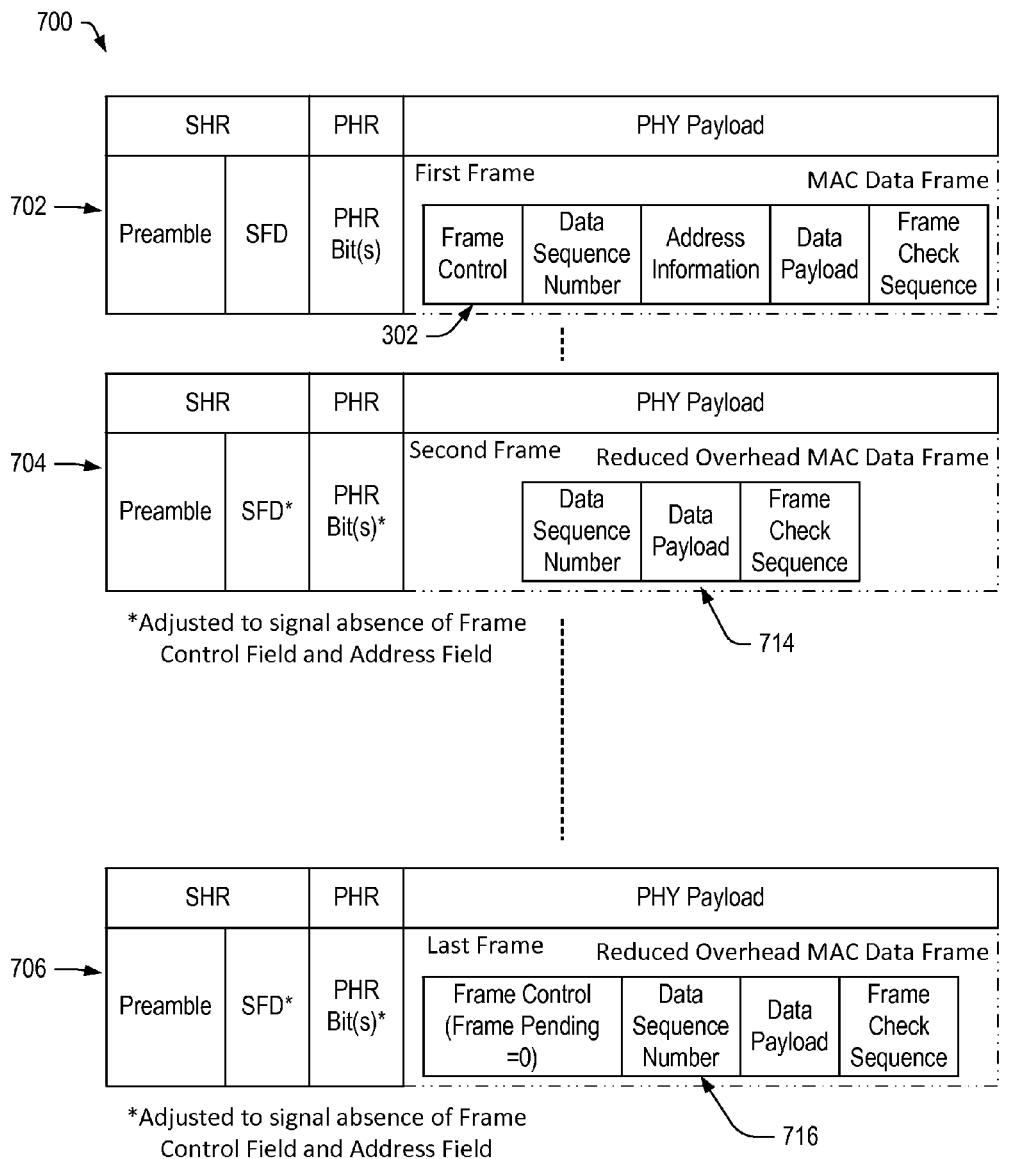
FIG. 7 is a block diagram of a sequence of physical protocol data units, each of which includes a MAC frame, some of which may be configured to provide a communication protocol with reduced overhead according to certain embodiments.

FIG. 7 is a block diagram of a sequence 700 of PPDUs 702, 704, and 706, each of which includes a MAC frame, some of which may be configured to provide a communication protocol with reduced overhead according to certain embodiments. The PPDU 702 includes a standard synchronization header, a standard PHY header, and a MAC frame 302 including frame control, data sequence number, address information, data payload, and frame check sequence data. The PPDU 702 may be a first PPDU in a sequence with the pending frame bit set to one.

Upon receipt of an acknowledgment of the first PPDU 702, the system may generate a PPDU 704, which may have an altered MAC frame 714. In this example relative to the MAC frame 302, the frame control field and the address information field may be omitted. The PPDU 704 may include an indicator to signal the altered MAC frame 714. In certain embodiments, the SFD of the synchronization header may include a bit setting to indicate the altered MAC frame 714. In certain embodiments, the PHY header may include a bit or multiple bit setting to indicate the altered MAC frame 714. In certain embodiments, both the SFD and the PHY header may include bit values to indicate the altered MAC frame 714.

PPDU 706 may represent a last frame in the sequence of frames. The PPDU 706 may include an altered MAC frame 716 that includes the frame control field, but continues to omit the address information field. The frame control field includes a frame pending bit that is set to zero. In certain embodiments, the PPDU 706 may still include altered SFD or PHY header fields to indicate the altered MAC frame 716. In this example, if the frame pending bit is zero and the frame type field does not specify that the frame is an acknowledgment or a beacon frame, the source addressing mode field shall be non-zero, implying that the frame is directed to the PAN coordinator with the PAN identifier as specified in the Source PAN identifier field.

In certain embodiments, there is a possibility that the receiver circuit may receive a ghost frame. The term "ghost frame" refers to a relatively strong signal that interferes with the received PPDU signal that includes a MAC frame with omitted frame control and address fields. In response to the "ghost frame", the receiver circuit may utilize the MAC controller 111 to verify the sequence number of the MAC frame. If the MAC frame is not sequential, the MAC controller 111 may communicate with the CPU 126 or with other components to ignore the MAC data and to refrain from acknowledging receipt of the MAC frame, which may cause the transmitter to resent the frame. In response to the "ghost frame", the PHY controller 112 may check if the arrival (receipt) of the frame is outside of an expected turnaround time window. If it is outside of that time window, the PHY controller 112 may communicate with the CPU 126 or with other components to ignore the MAC data and to refrain from acknowledging receipt of the MAC frame.

Figure 8:
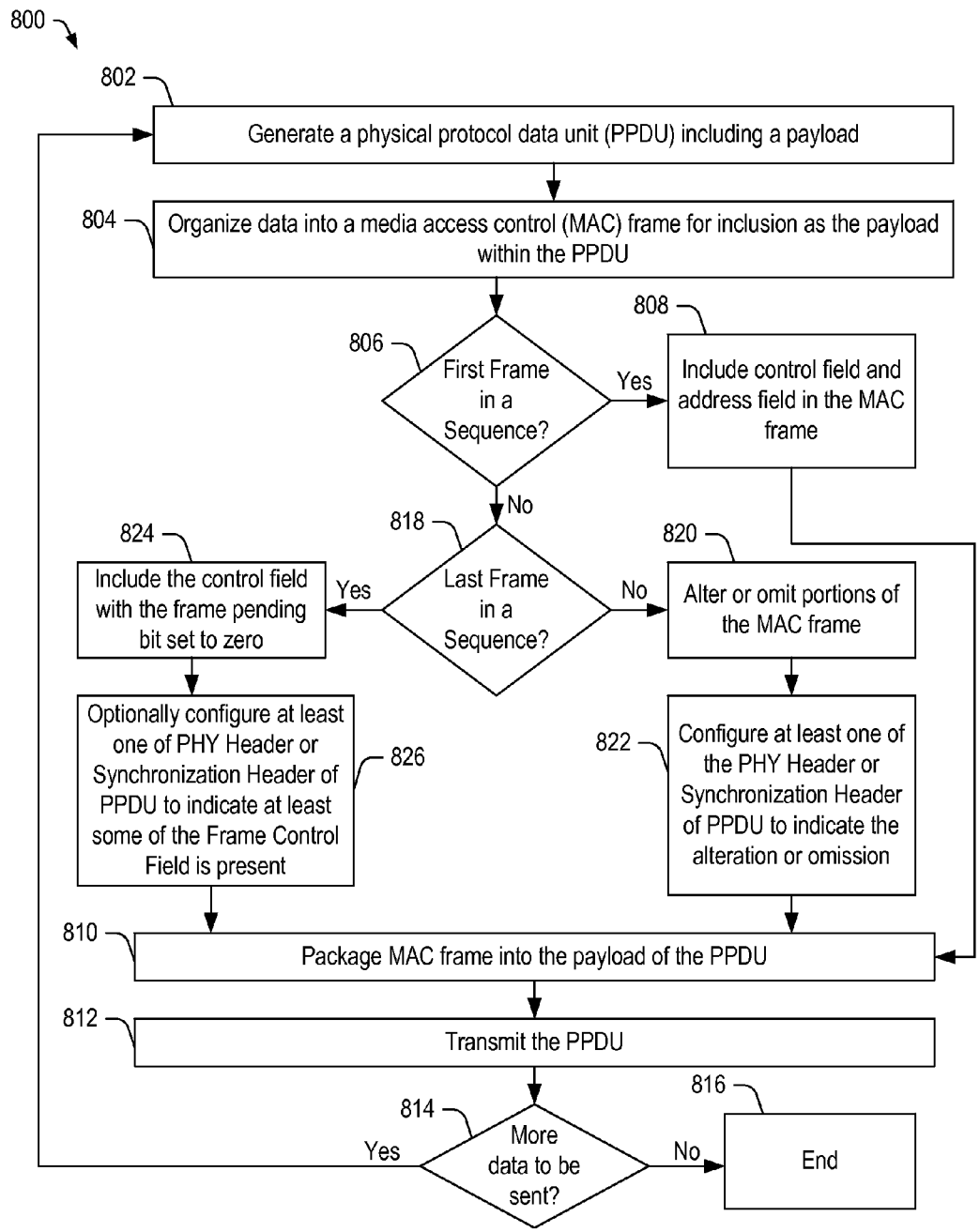
FIG. 8 is a flow diagram of a method of providing a communication protocol with reduced overhead according to certain embodiments.

FIG. 8 is a flow diagram of a method 800 of providing a communication protocol with reduced overhead according to certain embodiments. At 802, a PPDU is generated that includes a payload. Advancing to 804, data is organized into a MAC frame for inclusion as the payload within the PPDU. Continuing to 806, if the MAC frame is a first frame in a sequence of frames, the method 800 advances to 808 and the control field and address field are included in the MAC frame.

Proceeding to 810, the MAC frame is packaged into the payload of the PPDU. Moving to 812, the PPDU is transmitted. Continuing to 814, if there is no more data to be sent, the method 800 terminates at 816. Otherwise at 814, if there is more data to be sent, the method 800 returns to 802 and a PPDU is generated that includes a payload.

Returning to 806, if the MAC frame is not the first frame in the sequence, the method 800 advances to 818 to determine if the MAC frame is the last frame in the sequence. If the MAC frame is not the last frame, the method 800 advances to 820 and portions of the MAC frame are altered or omitted. Proceeding to 822, at least one of the PHY header or the synchronization header of the PPDU is configured to indicate the alteration or omission. Advancing to 810, the MAC frame is packaged into the payload of the PPDU. Moving to 812, the PPDU is transmitted. Continuing to 814, if there is no more data to be sent, the method 800 terminates at 816. Otherwise at 814, if there is more data to be sent, the method 800 returns to 802 and a PPDU is generated that includes a payload.

Returning to 818, if the MAC frame is the last frame in the sequence, the method 800 continues to 824 and the control field is included with the frame pending bit set to zero. Advancing to 826, at least one of the PHY header or the synchronization header of the PPDU is optionally configured to indicate at least some of the frame control field is present in the MAC frame. Proceeding to 810, the MAC frame is packaged into the payload of the PPDU. Moving to 812, the PPDU is transmitted. Continuing to 814, if there is no more data to be sent, the method 800 terminates at 816.

While the method 800 describes a PHY header or a synchronization header of a PPDU, it should be understood that blocks 822 and 826 may be understood to modify a portion of the PPDU (whether that portion is part of the synchronization header (preamble or SFD) or the PHY header). Further, it should be understood that portions of the MAC frame may be altered or omitted, and the PPDU may be altered to signal the alteration or omission.

Further, while the method 800 produces a PPDU at block 802 before the MAC frame is generated at 804, it should be understood that block 804 may be moved ahead of 802 in the method 800 without departing from the scope of the disclosure. Further, in certain embodiments, blocks 802 and 804 may represent processes that are performed at substantially the same time or at overlapping times.

Figure 9:
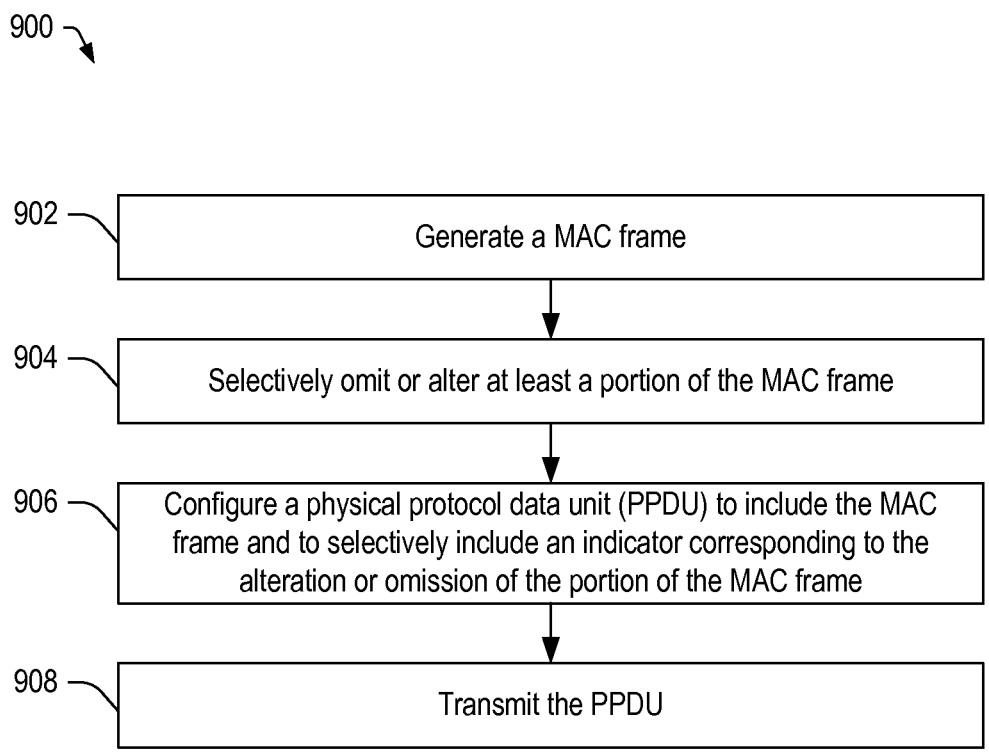
FIG. 9 is a flow diagram of a method of providing a communication protocol with reduced overhead according to certain embodiments.

FIG. 9 is a flow diagram of a method 900 of providing a communication protocol with reduced overhead according to certain embodiments. At 902, a MAC frame is generated. Advancing to 904, at least a portion of the MAC frame is selectively omitted or altered. Continuing to 906, a PPDU is configured to include the MAC frame and to selectively include an indicator corresponding to the alteration or omission of the portion of the MAC frame. Moving to 908, the PPDU is transmitted.

In the above-discussion of FIGS. 1-9, the apparatus, circuits, and methods provide a communication protocol having reduced overhead. In certain embodiments, after the first frame in a multi-frame sequence, a MAC frame may be modified to alter or omit a portion and a PPDU having the altered MAC frame as its payload may include a modified portion signaling the alteration or omission within the MAC frame. Within a sequence of frames, the frames between the first and last frames may omit or alter repeated information, such as repeated frame parameters. By omitting or altering the portion of the MAC frame, energy can be conserved. In applications where energy saving is important, such as electrical devices that utilize energy harvesting or batteries (such as coin cells) for power, reduced overhead in the communication frames may reduce the overall power consumption.

If the frame control and addressing is substantially unchanged from frame to frame, after the initial frame, such data can be considered redundant and may be omitted from subsequent frames, thereby reducing overhead, conserving processing resources and energy. Frame parameter repetition (i.e., alteration or omission of portions of the frame in the data payload) can be signaled by altering a portion of the PPDU.

While the above-discussion describes the overhead savings in terms of a PPDU and a MAC frame within the PPDU payload, it should be appreciated that other data protocols may be used and that repetitive portions of other data structures may be omitted or altered to reduce overhead. In certain embodiments, a portion of a data structure may be omitted or altered, and an encapsulating structure (such as a packet) may be modified to provide an indication of the omission or alteration.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

Although the present invention has been described with reference to preferred embodiments, workers skilled in the art will recognize that changes may be made in form and detail without departing from the scope of the invention.

What is claimed is:

1. An apparatus comprising:
   a transceiver including:
      a media access control (MAC) controller configured to selectively omit at least one of a frame control field and an addressing field of a MAC frame; and
      a physical layer (PHY) controller configured to insert the MAC frame into a physical protocol data unit and to selectively configure a portion of the physical protocol data unit to indicate omission of the at least one from the MAC frame.

2. The apparatus of claim 1, wherein the MAC controller is configured to receive an acknowledgement of receipt of a first MAC frame of a sequence of MAC frames and to omit the at least one of the frame control field and the addressing field in subsequent MAC frames of the sequence in response to receiving the acknowledgement.

3. The apparatus of claim 1, wherein the portion of the physical protocol data unit comprises a start-of-frame delimiter (SFD) of a synchronization header of the physical protocol data unit.

4. The apparatus of claim 1, wherein the portion of the physical protocol data unit comprises a preamble of the physical protocol data unit.

5. The apparatus of claim 1, wherein the portion of the physical protocol data unit comprises a physical protocol header (PHR) of the physical protocol data unit.

6. The apparatus of claim 5, wherein the PHR comprises a skip frame control and address field portion indicating omission of the portion.

7. The apparatus of claim 1, wherein the MAC controller is configured to determine a last MAC frame of a sequence of MAC frames and to selectively include a frame control field including an indication of the last MAC frame within the sequence of MAC frames.

8. The apparatus of claim 7, wherein the PHY controller selectively configures the portion of the physical protocol data unit to indicate inclusion of the control field.

9. A method comprising:
   in response to receiving an acknowledgement of receipt of a first media access control (MAC) frame of a sequence of MAC frames, selectively omitting at least one of a control field and an addressing field from the MAC frame; and
   selectively configuring a physical protocol data unit to include the MAC frame and to include an indication of omission of the at least one from the MAC frame.

10. The method of claim 9, further comprising:
    determining a parameter of the MAC frame; and
    wherein the at least one is selectively omitted within the MAC frame in response to determining the parameter.

11. The method of claim 10, wherein a MAC controller determines the parameter.

12. The method of claim 9, wherein at least the portion of the field is included when the MAC frame is a first frame of a sequence of frames.

13. The method of claim 12, further comprising selectively configuring the physical protocol data unit comprises configuring one of a synchronization header and a physical protocol header of the physical protocol data unit to indicate inclusion of a frame control field including a pending frame indicator configured to indicate the last frame when the MAC frame is the last frame.

14. The method of claim 9, wherein at least some of the portion of the field is included when the MAC frame is a last frame of a sequence of frames.

15. The method of claim 9, wherein selectively configuring a physical protocol data unit includes providing an indication of last frame of a sequence of frames.

16. The method of claim 9, wherein selectively configuring the physical protocol data unit comprises configuring a physical protocol header of the physical protocol data unit to indicate omission of the at least one of the control field and the addressing field from the MAC frame.

17. The method of claim 9, wherein selectively configuring the physical protocol data unit comprises configuring a synchronization portion of the physical protocol data unit to indicate omission of the at least one of the control field and the addressing field from the MAC frame.

18. An apparatus comprising:
    a transceiver including:
       a media access control (MAC) controller to selectively omit at least one of a control field and an address field of a MAC frame in response to receiving an acknowledgement of receipt of a previous MAC frame of a sequence of MAC frames; and
       a physical layer (PHY) controller to insert the MAC frame into a physical protocol data unit and to selectively configure a portion of the physical protocol data unit to indicate omission of the portion of the MAC frame.

19. The apparatus of claim 18, wherein the MAC controller is configured to:
    determine a parameter of the MAC frame; and
    selectively omits the portion of the MAC frame in response to determining the parameter.

20. The apparatus of claim 18, wherein the PHY controller selectively configures a physical protocol header of the physical protocol data unit to indicate omission of the portion .

21. The apparatus of claim 18, wherein the MAC controller selectively omits at least the portion of the MAC frame when the MAC frame is not a first MAC frame of a sequence of MAC frames.

* * * * *